No. 640,088. Patented Dec. 26, 1899.
F. G. & E. C. BROUGHTON.
SACK LIFTER.
(Application filed Apr. 14, 1899.)
(No Model.) 2 Sheets—Sheet 1.
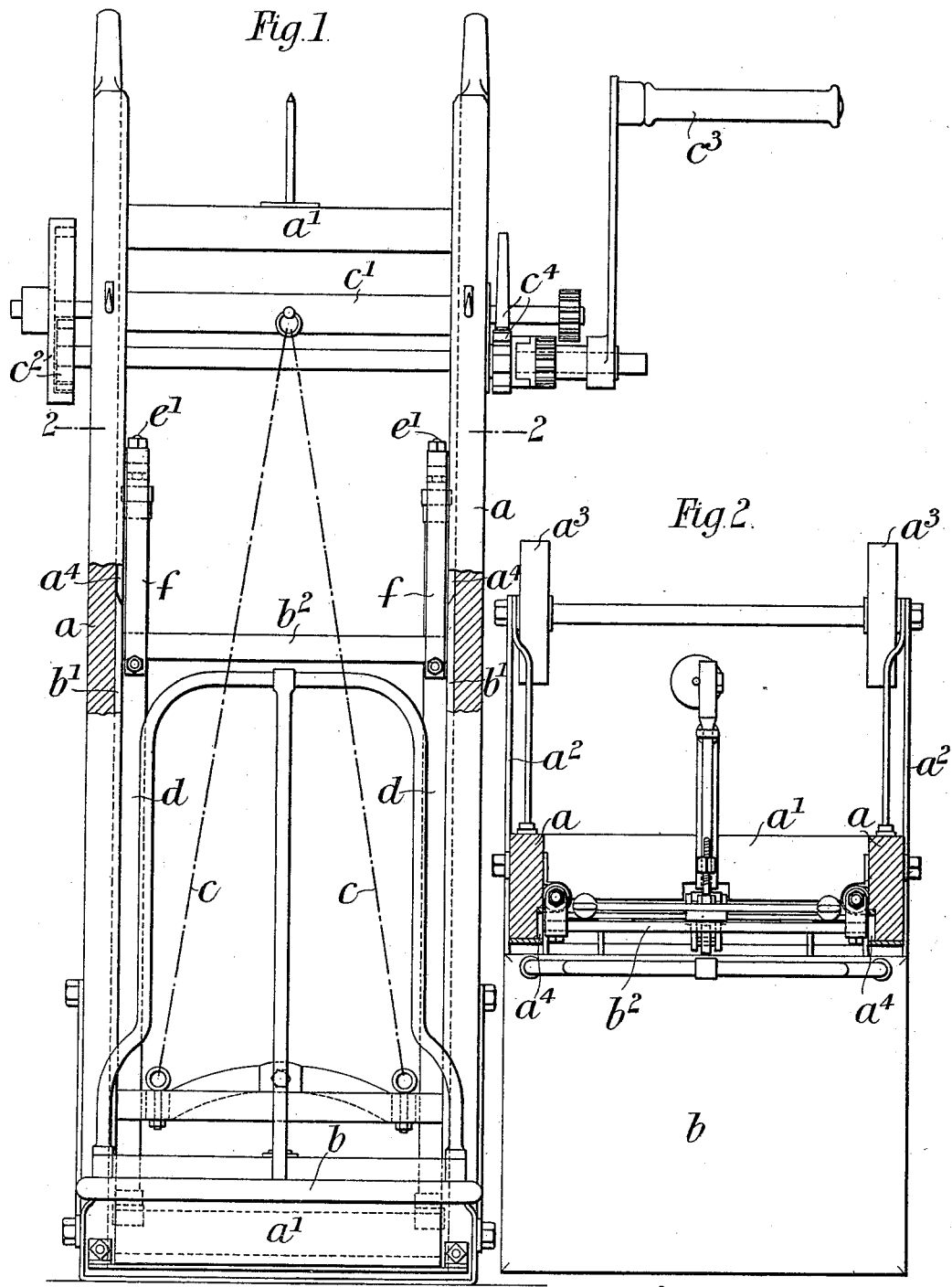

No. 640,088. Patented Dec. 26, 1899.
F. G. & E. C. BROUGHTON.
SACK LIFTER.
(Application filed Apr. 14, 1899.)
(No Model.) 2 Sheets—Sheet 2.
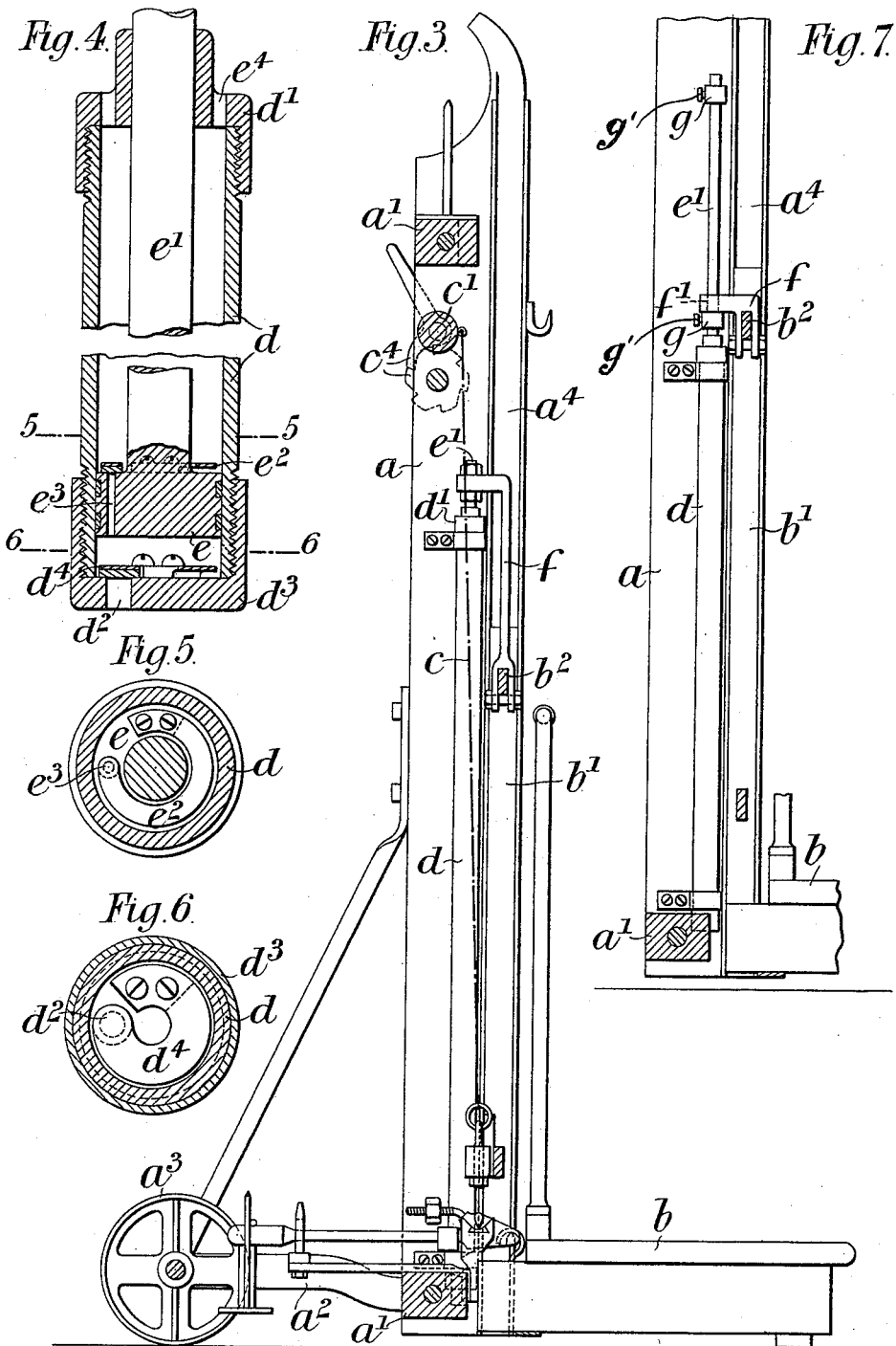
Witnesses
J. D. Kingsbury
B. W. Brockett
Inventors
Fred G. Broughton
Ernest C. Broughton
By Whitaker & Prevost Attys.
THE NORRIS PETERS CO., PHOTO-LITHO., WASHINGTON, D. C.

UNITED STATES PATENT OFFICE.

FRED GRANTHAM BROUGHTON, OF ANERLEY, ENGLAND, AND ERNEST CHRISTOPHER BROUGHTON, OF CALCUTTA, INDIA.

SACK-LIFTER.

SPECIFICATION forming part of Letters Patent No. 640,088, dated December 26, 1899.

Application filed April 14, 1899. Serial No. 713,019. (No model.)

*To all whom it may concern:*

Be it known that we, FRED GRANTHAM BROUGHTON, residing at Anerley, England, and ERNEST CHRISTOPHER BROUGHTON, of 8 Dum Dum, Calcutta, India, subjects of the Queen of Great Britain, have invented new and useful Improvements in and Connected with Sack-Lifters, (for which we have applied for a patent in Great Britain, No. 15,577, dated July 15, 1898,) of which the following is a specification.

This invention relates to improvements in and connected with sack-lifters.

In sack-lifters as hitherto usually made—that is to say, in sack-lifters wherein a platform for holding the sack is held upon a suitable support, such as a sack-barrow, and is adapted to be raised by means of a crank and axle and chains—the machine is frequently broken owing to the sudden fall of the platform when the ratchet-gear, in connection with the crank and axle, is released to allow of the said platform being lowered. Such machines are usually provided with a suitable hand-brake—for example, a band-brake—to control the descent of the platform, but these brakes have been found to be unsatisfactory in practice.

Now it is the object of our invention to provide simple and efficient means for controlling the descent of the platform after a sack has been removed therefrom, and to this end we employ, in conjunction with the said rising and falling platform, one or more cylinders and pistons designed when the platform is raised to draw a charge of air into each cylinder, which said air on the descent of the platform acts as a buffer, so as to control the descent.

In carrying out the invention we advantageously connect the cylinders to the support for the platform and the pistons to the said platform, a suitable back-pressure valve being provided in the lower end of each cylinder to allow the air to enter when the platform is raised and normally to prevent its escape.

In the accompanying drawings, Figure 1 is a front sectional elevation of a hand-barrow sack-lifter having our improvements applied thereto. Fig. 2 is a sectional plan, the section being taken on the line 2 2, Fig. 1. Fig. 3 is a sectional side elevation of the machine. Fig. 4 is a vertical section through one of the cylinders, drawn to a larger scale. Fig. 5 is a transverse section on the line 5 5, Fig. 4. Fig. 6 is a section on the line 6 6, Fig. 4; and Fig. 7 is a sectional elevation illustrating a modified construction of the machine.

The machine shown is of the kind described in the specification of British Patent No. 1,392 of 1883. $a$ $a$ are the side frames of the sack-lifter, the said side frames being connected together by cross-bars $a'$ and being provided with a foot $a^2$, upon which are mounted wheels $a^3$. $b$ is the weighing-platform or elevator, the said elevator having side bars $b'$, which slide in grooves $a^4$ in the side frames $a$ $a$. $c$ $c$ are the hoisting-chains, which are connected at one end to the frame carrying the platform $b$ and at the other end to the windlass or barrel $c'$, adapted to be rotated by the gear $c^2$ and handle $c^3$. $c^4$ is the ratchet-and-pawl gear, which normally prevents the descent of the platform $b$. All these parts are of well-known construction and we make no claim to them in this specification.

$d$ $d$ are the cylinders, which are fitted to the side frames $a$ $a$ and which are provided with pistons $e$, having rods $e'$, which pass through the upper cylinder-covers $d'$ and are connected with the side bars $b'$ through the medium of connecting-rods $f$, attached to cross-pieces $b^2$, connecting the side bars $b'$, as clearly indicated in the drawings. Each cylinder is provided with a hole $d^2$ in the lower cylinder-cover $d^3$, the said hole being normally closed by a valve, preferably of the kind shown—that is to say, of a curved strip of spring metal $d^4$, which is secured at one end to the cylinder-cover $d^3$, the free end being held by the elasticity of the strip against the hole $d^2$, so that air is allowed to enter the cylinder on the upward movement of its piston $e$, but is prevented from escaping therefrom on the downward stroke of the piston.

$e^2$ is a spring piston-valve, preferably of the kind above described, which closes a small hole $e^3$, passing through the piston and allowing the spaces on the two sides of the piston to communicate with one another, and $e^4$ are holes made in the top end of the cylinder. With this arrangement when the platform $b$ is elevated in the usual manner by means of the hoisting-gear $c^2$ $c^3$ the pistons $e$ are raised in the cylinders $d$, so as to draw into each cylinder a charge of air through its hole $d^2$. When the platform has been raised to its uppermost position, it is held by the ratchet-and-pawl gear $c^4$, and when the sack which it contains has been weighed in the usual manner the said gear $c^4$ is released, so as to allow the platform to descend. The descent is, however, controlled by the air in the cylinders, which acts as a buffer hindering the descent, which can only take place gradually as the air escapes through the piston-valves $e^2$, so that the very frequent breakages of or damage to the platforms or other parts of sack-lifting machines is obviated.

In the modified arrangement illustrated in Fig. 7 the connecting-rods $f$ are not rigidly connected to the piston-rods $e'$, as is the case in the first-described arrangement, but each rod $f$ is provided with a hole $f'$, through which the piston-rod $e'$ passes, so that the rod $f$ can slide upon the piston-rod, which is lengthened so as to project to a considerable extent beyond the cylinder. Each piston-rod is also provided with two collars $g$ $g$, between which the rod $f$ can slide, so that when the platform $b$ is elevated or lowered in the usual way it does not operate the pistons for a portion of its stroke—that is to say, while the rods $f$ $f$ are sliding upon the piston-rods $e'$ between the two collars $g$ $g$. These collars $g$ $g$ are secured to the piston-rods $e'$ $e'$ by means of setscrews $g'$ $g'$, as shown in Fig. 7, so that they are capable of vertical adjustment on said piston-rods to vary the amount of lost motion between the pistons and the platform. By this means we are enabled to considerably reduce the length of the cylinders $d$.

Although we have described and illustrated our improvements in connection with a combined sack-lifter and weighing machine, it will be obvious that they can be also applied to any sack-lifter or like machine which has a platform arranged to rise and fall. It will also be obvious that the inlet and outlet of the air can be controlled by any suitable means other than those above described.

Having now particularly described and ascertained the nature of our said invention and in what manner the same is to be performed, we declare that what we claim is—

1. In a sack-lifter, the combination with the main frame provided with vertical guides, of the vertically-movable platform provided with parts for engaging said guides, elevating devices for said platform, a vertically-disposed cylinder secured to the main frame and provided with an air-inlet aperture, a yielding valve normally closing said aperture, a piston in said cylinder provided with an air-outlet aperture, a yielding valve closing said aperture, a piston-rod connected to said piston and to a part connected with the platform whereby said piston and piston-rod will move vertically with the platform, substantially as described.

2. In a sack-lifter, the combination with the main frame provided with vertical guides, of a platform provided with vertical side bars working in said guides, vertical cylinders secured to said main frame, provided each with an air-inlet aperture, and a yielding valve for closing said aperture, a piston in each cylinder provided with an air-outlet aperture and a yielding valve normally closing the same, a piston-rod secured to each piston, connections between said platform and said piston-rods, whereby said pistons and piston-rods will move vertically with the platform and independent means for elevating said platform, substantially as described.

3. In a sack-lifter, the combination with the main frame of a vertically-movable platform, and means for elevating the same, a cylinder secured to the main frame, a piston working in said cylinder, and connections between said piston and said platform providing for lost motion, substantially as described.

4. In a sack-lifter, the combination with the platform or elevator of one or more cylinders secured to the frame of the sack-lifter of a piston or pistons working in the said cylinder or cylinders and each having a rod projecting beyond the cylinder, of collars upon each projecting piston-rod and of connecting-rods adapted to slide upon the piston-rods between the collars and connected to the platform or elevator, substantially as hereinbefore described.

5. In a sack-lifter, the combination with the main frame, of a vertically-movable platform, means for elevating the same, a cylinder secured to the main frame, a piston working in said cylinder, a piston-rod secured to said piston, a device connected to said platform and having a sliding engagement with said piston-rod, and means for limiting the said sliding engagement between the piston-rod and said device, whereby lost motion is provided between said platform and said piston, substantially as described.

6. In a sack-lifter, the combination with the main frame of a vertically-movable platform, means for elevating the same, a cylinder secured to the main frame, a piston working in said cylinder, a piston-rod secured to said piston, a device connected to said platform and having a sliding engagement with said piston-rod, adjustable devices secured to said piston-rod for limiting the said sliding engagement between said device and said piston-rod, substantially as described.

7. In a sack-lifter, the combination with the main frame of a vertically-movable platform provided with a connecting-rod having a vertical aperture therein, means for elevating said platform, a vertical cylinder secured to the main frame, a piston in said cylinder, a piston-rod connected to said cylinder, and extending loosely through the aperture in said connecting-rod, a collar adjustably secured to said piston-rod, below said connecting-rod and a collar adjustably secured to said piston-rod above said connecting-rod, to limit the amount of lost motion between the piston and said platform, substantially as described.

FRED GRANTHAM BROUGHTON.
ERNEST CHRISTOPHER BROUGHTON.

Witnesses to the signature of Fred Grantham Broughton:
 C. G. REDFERN,
 A. ALBUTT.

Witnesses to the signature of Ernest Christopher Broughton:
 ALFRED THOMPSON,
 THOMAS R. MABEY.